United States Patent
Allen et al.

[15] 3,685,703
[45] Aug. 22, 1972

[54] PULSING CONVEYORS

[72] Inventors: Kenneth M. Allen; Chester H. Harper, P.O. Box 352, both of Newberg, Oreg. 97132

[22] Filed: Oct. 8, 1969

[21] Appl. No.: 864,816

[52] U.S. Cl. ................ 222/373, 222/558, 251/158, 251/179
[51] Int. Cl. ............................................ B65d 47/08
[58] Field of Search ...... 302/55, 53, 42, 64; 251/158, 251/179, 299, 303; 222/558, 373

[56] References Cited

UNITED STATES PATENTS

| | | | |
|---|---|---|---|
| 1,887,773 | 11/1932 | Sablik | 302/55 |
| 2,380,651 | 7/1945 | Jeffery | 302/53 |
| 3,090,593 | 5/1963 | Pro | 302/55 |
| 2,923,261 | 2/1960 | Stoll | 302/55 |
| 1,314,065 | 8/1919 | Jackson | 222/558 X |
| 2,050,145 | 8/1936 | Wiseman | 251/158 X |
| 3,210,131 | 10/1965 | Booth et al. | 302/53 |

*Primary Examiner*—Evon C. Blunk
*Assistant Examiner*—W. Scott Carson
*Attorney*—Buckhorn, Blore, Klarquist & Sparkman

[57] ABSTRACT

In one embodiment, material metered by a conveyor 10 into the upper portion of hose 16 is dropped periodically into a T-cup 26 and blown by a nozzle 32 to a second stage, and a floating clamp 18 clamps the hose while the previous material is blown out of the T-cup. In an alternate embodiment, material is metered by a conveyor 110 into a charging tube 116, and, after a cap 122 has sealed the charging tube, air is blown through the charging tube to blow out the material.

2 Claims, 7 Drawing Figures

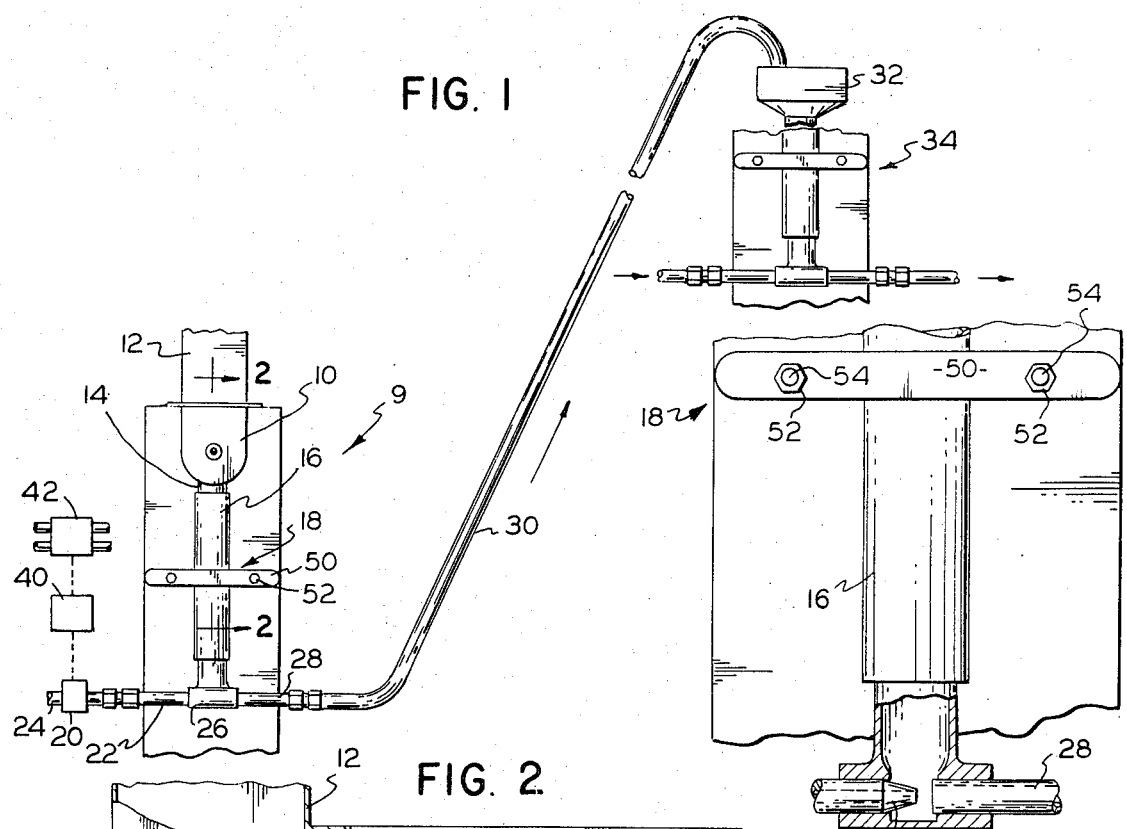
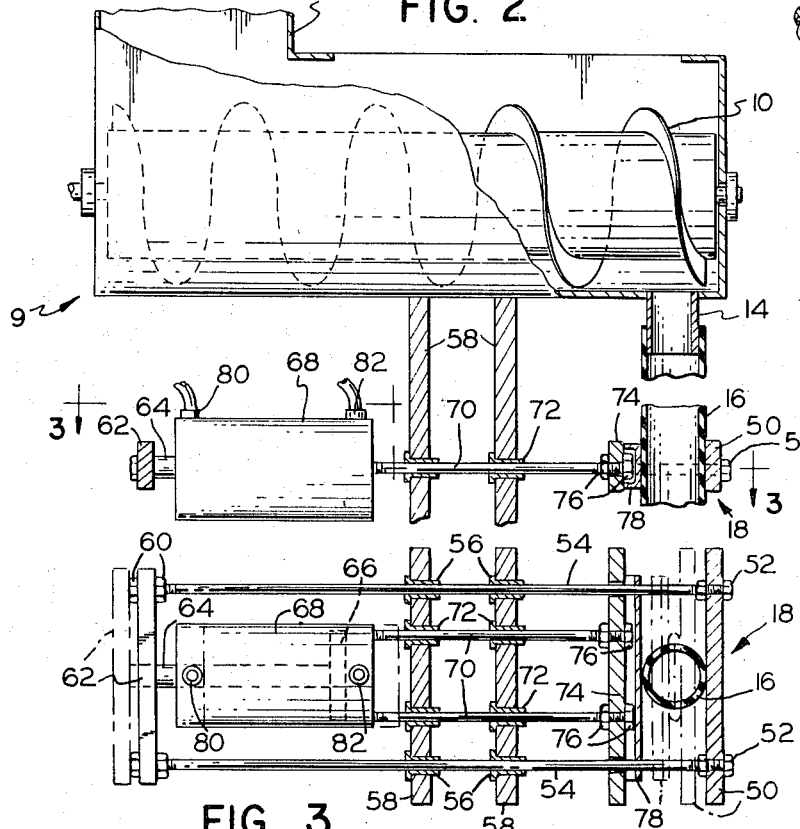

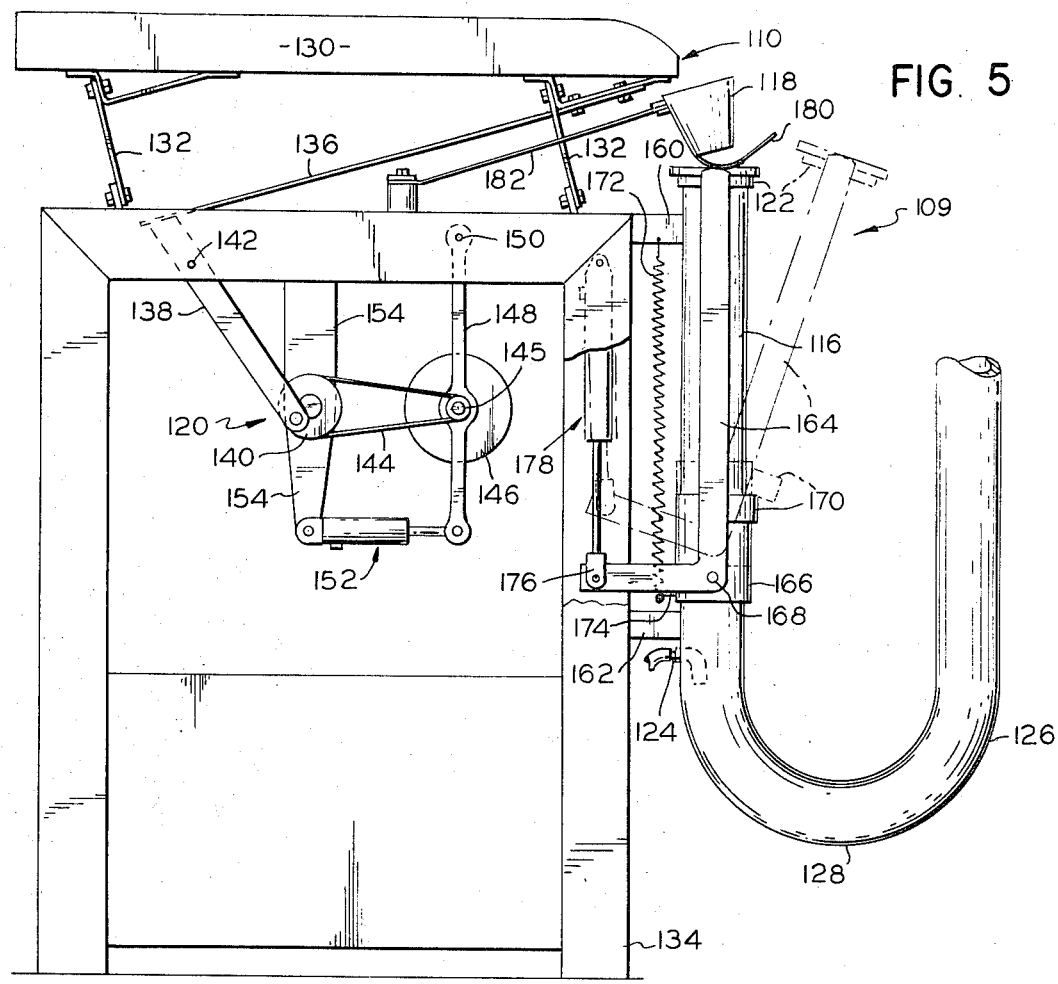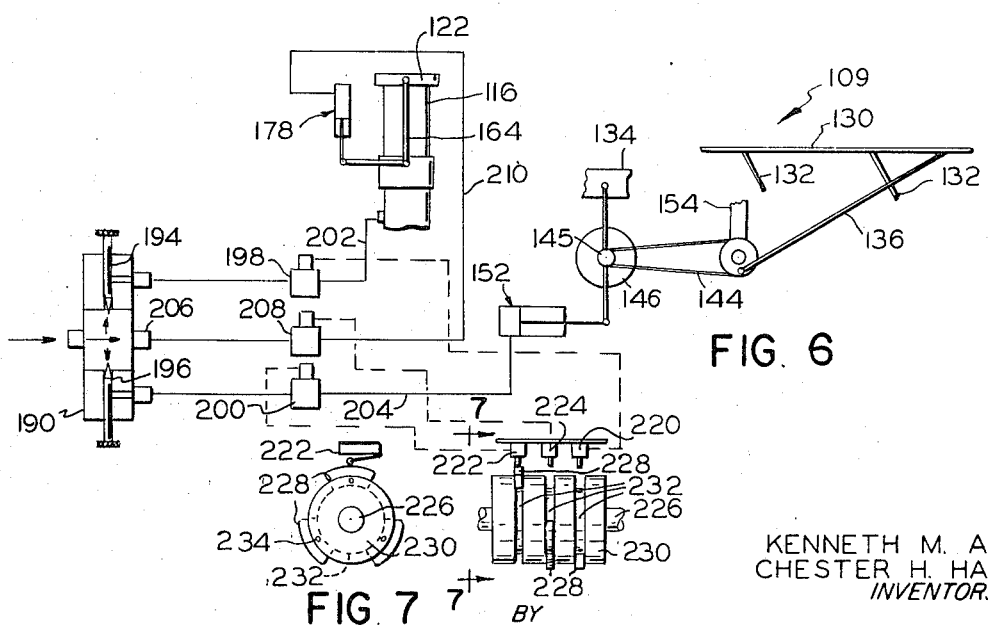

PULSING CONVEYORS

DESCRIPTION

This invention relates to an improved pulsing conveyor, and more particularly to improved conveyors for periodically advancing powdered or granular materials.

An object of the invention is to provide improved pulsing conveyors.

Another object of the invention is to provide improved conveyors for periodically advancing powdered or granular materials.

A further object of the invention is to provide a pulsing conveyor having a floating clamp.

Another object of the invention is to provide an improved pulsing conveyor having a charging tube sealed periodically by a cap sequentially swung from an open position to a spaced aligned position and then pulled down on the tube to seal the tube.

Another object of the invention is to provide simple, effective pulsing conveyors.

The invention provides improved pulsing conveyors each including a charging chamber, means for sealing the upper end of the chamber periodically, and means for introducing gas under pressure into the chamber to blow material from the chamber along a conduit. In one specific embodiment, the charging chamber is a flexible hose, and a piston and a cylinder are mounted floatingly, and carry opposed clamping members for clamping the hose to form a pinch valve therewith. In an alternate embodiment, a vertical tube open at the top is charged, a cap is swung over the tube and pulled down to seal the top, and gas under pressure is introduced into the tube to blow the material from the tube. In the drawings:

FIG. 1 is a fragmentary, front elevation view of an improved pulsing conveyor forming one embodiment of the invention;

FIG. 2 is an enlarged, fragmentary, side elevation view taken along line 2—2 of FIG. 1;

FIG. 3 is an enlarged, horizontal sectional view taken along line 3—3 of Fig. 2;

FIG. 4 is an enlarged, fragmentary, partially sectional view of a portion of the conveyor of Fig. 1;

FIG. 5 is a fragmentary, side elevation view of an improved pulsing conveyor forming an alternate embodiment of the invention;

FIG. 6 is a schematic view of the conveyor of Fig. 5; and

FIG. 7 is a vertical sectional view taken along line 7—7 of FIG. 6.

Referring now in detail to the drawings, there is shown therein a pulsing conveyor 9 forming one embodiment of the invention and including a continuously running metering conveyor 10 (Fig. 2) pushing granular or powdered material from a hopper 12 into a tubular outlet 14. The material drops through the outlet 14 into a flexible, valving hose 16 forming a charging chamber with a T-cup 26. When a clamp 18 is closed to pinch the central portion of the hose closed, an airtight seal is formed and the material piles up in the upper portion of the hose at a predetermined rate, and a valve 20 (Fig. 1) is opened to connect an injector tube or nozzle 22 to air under pressure from a line 24. The air under pressure blows the entire quantity of material in the hose 16 below the clamp 18 and in the T-cup 26 out through an exit tube 28 and through an upwardly extending conduit 30 and into an open funnel-like member 32 of a pulsing conveyor 34 like the pulsing conveyor just described except for receiving the material from the conduit 30 and the member 32 rather than from the conveyor 10.

After a predetermined period of time in which all the material is blown out of the hose 16 and the T-cup 26 and a new batch of a predetermined quantity of material has accumulated in the upper portion of the hose 16, a timer 40 actuates valve 20 to close the valve 20 and actuates a valve 42 to cause the clamp 18 to be opened. The material in the upper portion of the hose 16 then drops into the T-cup 26 and lower portion of the hose 16 to only partially fill the lower portion of the hose 16. Then the timer actuates the valves 42 and 20 to sequentially cause the clamp 18 to be closed and the valve 20 to be reopened and the cycle is begun again. The conveyor 34 is operated alternately with the conveyor 9.

The clamp 18 includes a bar 50 mounted by pairs of nuts 52 on rods 54 slidable in bushings 56 carried by frame members 58, which support the conveyor 10. The rods 54 are connected by pairs of nuts 60 to a crosshead 62 on a piston rod 64 of a piston 66 in a cylinder 68. The cylinder is floating and double acting, and is mounted on rods 70 slidable in bushings 72 in the frame members 58. A clamping bar 74 is mounted on the rods 70 by pairs of nuts 76 and carries rigidly a channel 78 covering the outer nuts 76 and serving to clamp the hose 16. The clamp 18 is floating or self-centering since both the rods 70 and the rods 54 can slide in the bushings in the frame members. Conduits 80 and 82 are connected to the valve 42 to alternately expand and contract the cylinder device. The hose tends to prevent bridging and, if desired, the conveyor 10 and hose may be vibrated to further prevent bridging.

EMBODIMENT OF FIGS. 5–7

A pulsing conveyor 109 forming an alternate embodiment of the invention includes a periodically operated, vibratory metering conveyor 110 which pushes granular, powdered or flaky material at a uniform rate to a rigid, open-topped charging chamber or tube 116 through a funnel 118. When a predetermined quantity of the material has been discharged from the conveyor 110, a drive 120 of the conveyor 110 is stopped. A cupped sealing cap 122 having a circular sealing gasket (not shown) therein then is swung over the top of the tube 116 and is pulled down to seal off the top of the tube. Then air under pressure is introduced into the tube through a downwardly directed nozzle 124 to blow the metered charge of material through a U-shaped bottom portion 128 thereof and conduit 126 to the point of delivery. When all the material has been blown out of the conduit 126, the cap 122 is raised off the upper end of the charging tube, and is swung to one side of the tube and the conveyor 110 is restarted to deliver the next metered charge to the tube 116. The operation described above then is repeated.

The conveyor 110 comprises a trough-like conveyor bed 130 (Fig. 5) receiving material at its lefthand end from a hopper or another conveyor (not shown).

The bed 130 is supported by slightly sloping spring arms 132 carried by a frame 134. The bed is driven by a spring arm 136 connected to a lever 138 driven by a crank 140 and pivoted on pin 142. The crank is driven by a belt 144 driven by a pulley 145, a motor 146 carried by arm 148 pivotal on the frame by a pin 150. A cylinder drive 152 is pivotally connected to the arm 148 and a bracket 154 rigid on the frame 134. The crank has a pulley portion receiving the belt and driven thereby when the belt is taut. When the cylinder drive 152 is extended, the belt is tightened and drive of the crank occurs. When the cylinder device 152 is contracted, the belt is loosened and the crank is not driven.

The tube 116 is supported in a fixed position at one side of the frame 134 by spacing brackets 160 and 162 rigidly fixed to the tube 116. The cap 122 is carried by a pair of parallel bellcrank levers 164 pivotally mounted on a sleeve-like slide 166 by axially aligned pins 168 and connected rigidly together by an arcuate brace 170 adapted to engage the slide 166 when the cap 122 is aligned with the tube 116. The slide 166 fits closely and slidably on the tube 116 and is urged upwardly thereon by a spring 172 secured to the bracket 160 and to an ear 174 fixed to the slide 166. The portions of the bellcrank levers to the left of the pins 168 converge to form a "Y" and are pivotally connected to a clevis 176 of a cylinder drive 178 mounted at its upper end pivotally on the frame.

When the cylinder drive 178 is contracted, it and the spring 172 hold the bellcrank levers 164 and the cap 122 in the broken line positions thereof shown in Fig. 5. When the cylinder drive 146 is extended, it first swings the bellcrank levers and the cap counterclockwise, as viewed in Fig. 5, to a position in which the cap is directly over the open upper end of the tube 116, the spring 172 holding the slide 166 in its upper position and the cap sliding under a forked cam 180 carried by the funnel 118, the funnel being mounted by a spring arm 182 on the frame and being cammed up out of its operative position when the cap is moved over the tube 116. The forked cam 180 brackets the tube 116 and does not obstruct the outlet of the funnel, the forked opening of the cam being below the outlet of the funnel. Continued extension of the cylinder drive 178 then pushes the slide 166 downwardly, the bellcrank levers being prevented from further counterclockwise movement by the brace 170, which is in engagement with the slide 166. The slide pulls the cap 122 down into tight, sealing engagement with the upper end of the charging tube 116 and the cylinder drive 178 is maintained extended while the material in the charging tube is blown by the nozzle 124 through the conduit 126.

In Fig. 6, the conveyor 109 is shown schematically with its control circuitry, which includes a distributing valve 190 having an inlet 192 connected to a source of air under pressure and including adjustable needle valve outlets 194 and 196 leading to solenoid-operated shutoff valves 198 and 200, respectively. The valves 198 and 200 are in lines 202 and 204 leading to the nozzle 124 and the cylinder drive 152, respectively. A third outlet 206 leads to a solenoid-operated shutoff valve 208 in a line 210 leading to the cylinder drive 178. The cylinder drives 152 and 178 are single-acting. That is, they are pressure actuated in one direction and are spring returned in the opposite direction.

The solenoid-operated valves 198, 200 and 208 are controlled by electrical switches 220, 222 and 224 operated by a continuously driven timer shaft 226 through cams 228 of a rotor 230. The cams are adjustable in peripheral grooves 232 in the rotor and are locked in adjusted positions by screws 234 screwed into tapped bores in the rotor.

What is claimed is:
1. In a pulsing conveyor,
   a vertical charging tube open at the top to define an open upper inlet and having a lower outlet,
   means for periodically feeding metered batches of material into the charging chamber through the inlet,
   a cap for closing the top of the tube,
   a slide slidable along the tube,
   bellcrank lever means pivotally mounted on the slide and including first arm means extending generally along the tube and carrying the cap and second arm means generally transverse to the tube,
   the slide being slidable upwardly to move the cap upwardly away from the top of the tube to an intermediate position,
   stop means for limiting movement of the lever means in one direction to a position in which the cap is aligned with the tube and permitting movement of the lever means in the other direction,
   the bellcrank lever means serving to swing the cap in said other direction to one side of the tube in which the second arm means is swung upwardly,
   the bellcrank lever means serving to first swing the cap to the intermediate position thereof and then move the slide and the cap downwardly when swung in said one direction and pushed farther downwardly,
   means urging the slide toward the top of the tube,
   actuating means for sequentially swinging the second arm means to the intermediate position and then moving the slide downwardly,
   and means for periodically introducing gas under pressure into the chamber while the cap is closed to blow material in the chamber out of the outlet.
2. The pulsing conveyor of claim 1 wherein the actuating means is a cylinder drive connected to the second arm means of the bellcrank lever means and reciprocable primarily vertically to move the lever means and the slide along the tube,
   the relative forces of the urging means and the actuating means on the slide being such as to move the slide upwardly before the lever means is swung when the actuating means is operating upwardly and the lever means is swung before the slide is moved downwardly when the actuating means is operating downwardly.

* * * * *